United States Patent Office 3,310,560
Patented Mar. 21, 1967

3,310,560
THIOPHOSPHORIC ACID ESTERS
Rupert Schönbeck, Leonding, near Linz, Engelbert Kloimstein, Eferding, and Walther Beck and Alfred Diskus, Linz, Austria, assignors to Osterreichische Stickstoffwerke Aktiengesellschaft, Linz, Austria
No Drawing. Filed Mar. 22, 1966, Ser. No. 536,308
Claims priority, application Austria, Mar. 25, 1965, A 2,705/65
10 Claims. (Cl. 260—250)

This invention relates to thiophosphoric acid esters and to a process for the preparation thereof.

In accordance with the invention there is provided a thiophosphoric acid ester having the formula:

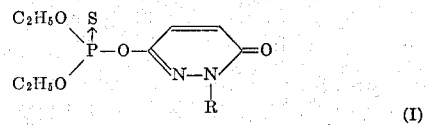

(I)

in which R is a member selected from the group consisting of hydroxy-ethyl, cyanoethyl, lower alkoxy-carbonylmethyl, lower alkoxy-carbonyl-ethyl, di-lower alkyl-carbamyl-methyl and di-lower alkyl-carbamyl-ethyl radicals.

When R is a lower alkoxy-carbonyl-methyl or lower alkoxy-carbonyl-ethyl radical the alkyl group is preferably a methyl, ethyl, n-propyl or isopropyl group, and when R is a di-lower alkyl-carbamyl-ethyl or di-lower alkyl-carbamyl-methyl radical the alkyl group is preferably a methyl or ethyl group.

The compounds of this invention have valuable insecticidal and acaricidal properties, and they are effective against a wide range of insects and mites and are suitable as pesticides for plant and stock protection. Some of the compounds falling within Formula I are capable of penetrating into the metabolic system of plants and thus possess systemic properties.

The invention also provides a process for the preparation of a thiophosphoric acid ester having the Formula I above which comprises reacting O,O-diethyl-thiophosphoryl chloride with a pyridazone derivative having the formula

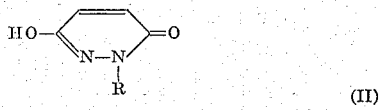

(II)

in which R has the same meaning as given in Formula I.

The reaction is preferably carried out in the presence of anhydrous sodium carbonate and in dimethyl formamide, which is inert under the reaction conditions.

Since in most cases a homogeneous reaction solution is not obtained, intensive stirring of the mixture should preferably be carried out. The reaction can be carried out at temperatures between 10° and 100° C., and is frequently effected at the boiling point of the solvent. The starting materials are preferably admixed in stoichiometric amounts. The yields are between 50 and 80% of theory. The thiophosphoric acid esters thus obtained are in part oily, in part solid substances with low melting points.

The pyridazone compounds used as starting materials can, for example be obtained by reacting maleic anhydride with a substituted hydrazine as illustrated by the following equation:

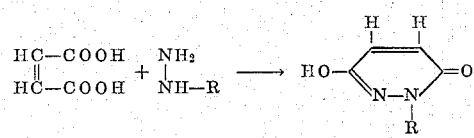

in which R has the same meaning as given above.

The invention is further illustrated by the following examples:

EXAMPLE 1

*O,O-diethyl-O-[-1-β-cyano-ethyl-pyridazone-(6)-yl-(3)]-thiophosphate*

16.5 parts of 1-β-cyano-ethyl-3-hydroxypyridazone-(6), 11 parts of anhydrous sodium carbonate, 150 parts by volume of dimethyl formamide and 18.85 parts of O,O-diethyl-thiophosphoryl chloride were stirred intensively for 3 hours. The temperature of the reaction mixture rose from 20° to 40° C. during the first hour. During the next two hours the temperature fell to 25° C. The inorganic salts were filtered and dimethyl formamide was distilled off from the filtrate under vacuum on a water bath. The residue was dissolved in 100 parts of toluene, the toluene solution was twice extracted with 80 parts by volume of a 5% sodium carbonate solution and the solution dried with sodium sulfate and filtered over activated carbon. The colourless filtrate was evaporated under vacuum, the residue which remained, solidified and had a melting point of 50° to 52° C. After recrystallisation from ether the product had a melting point of 51° to 53° C.

The yield was 23 parts, corresponding to 72.5% of theory.

Analysis.—Calc.: N, 13.24%; S, 9.76%; P, 10.10%. Found: N, 13.00%; S, 9.4%; P, 10.3%.

The preparation of the 1-β-cyano-ethyl-3-hydroxy-pyridazone-(6) used as starting material was carried out as follows:

200 parts of 98% hydrazine hydrate were diluted with 200 parts of water and 212 parts of acrylonitrile were added dropwise with intensive stirring at a temperature of 25° to 30° C. during a period of 2 hours.

The reaction solution was then treated with a mixture comprising 200 parts of conc. sulfuric acid and 500 parts of water. 400 parts of maleic anhydride were added to the β-cyano-ethyl-hydrazine sulfate solution thus obtained, the reaction mixture was brought to its boiling point in 30 minutes and then boiled with sitrring under reflux for a period of 1 hour. The crystalline product which separated out on cooling was centrifuged at 10° C., and the crude product recrystallised from 1000 parts of water.

Yield: 590 parts, corresponding to 90% of theory. M.P.=220° to 222° C.

EXAMPLE 2

*O,O-diethyl-O-[1-β-ethoxy-carbonyl-ethyl-pyridazone-(6)-yl-(3)]-thiophosphate*

21.2 parts of 1-β-(ethoxy-carbonyl)-ethyl-3-hydroxy-pyridazone-(6), 11 parts of sodium carbonate, 150 parts by volume of dimethyl formamide and 18.85 parts of O,O-diethyl-thiophosphoryl chloride were admixed and intensively stirred for 3 hours, during which the temperature of the reaction mixture rose to a temperature not exceeding 36° C. After filtering and evaporating the solvent, the residue was dissolved in 100 parts by volume of toluene, the solution was twice extracted with 80 parts by volume of 5% sodium carbonate solution, dried with sodium sulfate, purified with animal charcoal, and the solvent evaporated to dryness under vacuum. There remained 26.0 parts of an oily product, corresponding to 71.5% of theory, $n_D^{20}=1.5057$.

Analysis.—Calc.: N, 7.69%; S, 8.80%; P, 8.50%. Found: N, 7.60%; S, 9.0%; P, 8.80%.

The following analogous esters were prepared in a similar manner:

O,O-diethyl-O-[1-β-(methoxy-carbonyl)-ethyl-pyridazone-(6)-yl)-(3)]-thiophosphate; $n_D^{20}$ 1.5125; yield 54.0%.

O,O-diethyl-O-[1-β-(n-propoxy-carbonyl)-ethyl-pyridazone-(6)-yl-(3)]-thiophosphate; $n_D^{20}$ 1.5042; yield 47.8%.

O,O-diethyl-O-[1-β-(isopropoxy-carbonyl)-ethyl-pyridazone-(6)-yl-(3)]-thiophosphate; $n_D^{20}$ 1.5068; yield 40.0%.

O,O-diethyl-O-[1-β-(n-butoxy-carbonyl)-ethyl-pyridazone-(6)-yl-(3)]-thiophosphate; $n_D^{20}$ 1.5036; yield 6.3%.

The pyridazones used as starting material were prepared from 1-β-carboxy-ethyl-3-hydroxy-pyridazone-(6) by esterification with the appropriate alcohols.

EXAMPLE 3

*O,O-diethyl-O-[1-ethoxy-carbonyl-methyl-pyridazone-(6)-yl-(3)]-thiophosphate*

19.8 parts of 1-(ethoxy-carbonyl)-methyl-3-hydroxy-pyridazone-(6), 11 parts of sodium carbonate, 150 parts by volume of dimethyl-formamide and 18.85 parts O,O-diethyl-thiophosphoryl chloride were admixed and intensively stirred for three hours, during which time the temperature first rose to 36° C. After filtering and evaporating the solvent, the residue was dissolved in 100 parts by volume of toluene, and the solution was twice extracted with 50 parts by volume of a 5% sodium carbonate solution, dried, and the toluene evaporated. The oily residue thus obtained solidified when left to stand for a longer period. After recrystallising from a mixture of ether and petroleum ether, the product was found to have a melting point of 36° to 37° C. Yield: 19 parts, corresponding to 54% of theory.

*Analysis.*—Calc.: N, 7.99%; S, 9.15%; P, 8.84%; C, 40.9%; H, 5.5%. Found: N, 7.7%; S, 9.4%; P, 8.7%; C, 41.14%; H, 5.40%.

The following carboxy-alkyl esters were obtained in a similar manner:

O,O-diethyl-O-[1-methoxy-carbonyl-methyl-pyridazine-(6)-yl-(3)]-thiophosphate; M.P. 55° to 56° C., yield 66%.

O,O-diethyl-O-[1-n-propoxy-carbonyl-methyl-pyridazone-(6)-yl-(3)]-thiophosphate; $n_D^{20}$ 1.5046; yield 56%.

O,O-diethyl-O-[1-isopropoxy-carbonyl-methyl-pyridazone-(6)-yl-(3)]-thiophosphate; $n_D^{20}$ 1.5020; yield 62%.

O,O-diethyl-O-[1-n-butoxy-carbonyl-methyl-pyridazone-(6)-yl-(3)]-thiophosphate; $n_D^{20}$ 1.5070; yield 51%.

The compounds used as starting materials were obtained from 1-carboxy-methyl-3-hydroxy-pyridazone-(6) by esterification.

EXAMPLE 4

*O,O-diethyl-O-[1-β-hydroxy-ethyl-pyridazone-(6)-yl-(3)]-thiophosphate*

31.2 parts of 1-β-hydroxy-ethyl-3-hydroxy-pyridazone-(6), 22 parts of sodium carbonate, 300 parts by volume of dimethyl formamide and 37.7 parts of O,O-diethyl-thiophosphoryl chloride were admixed, stirred for three hours and filtered. The solution was evaporated to dryness and the residue dissolved in 200 parts by volume of toluene and was twice extracted with 100 parts by volume of 5% sodium carbonate solution, dried with sodium sulfate, purified with carbon and the toluene driven off by distillation in vacuo. 49 parts of a light yellow oil remained, corresponding to 80% of theory. $n_D^{20} = 1.5222$.

*Analysis.*—Calc.: N, 9.11%; S, 10.43%; P, 10.08%. Found: N, 9.10%; S, 10.6%; P, 9.8%.

The 1-β-hydroxy-ethyl-3-hydroxy-pyridazone-(6) used as starting material was prepared as follows:

98 parts maleic anhydride were dissolved in 400 parts by volume of water and were then treated with a solution comprising 76 parts β-hydroxy-ethyl-hydrazine, 400 parts by volume of water and 40 parts conc. sulfuric acid. This mixture was boiled under reflux for an hour; it was then cooled and the crystals which separated out were filtered. The product, after recrystallisation from water, had a melting point of 149° to 150° C., yield: 90 parts, corresponding to 58% of theory.

EXAMPLE 5

*O,O-diethyl-O-[1-N-diisopropyl-carbamyl-methyl-pyridazone-(6)-yl-(3)]-thiophosphate*

1.0 part of 1-diisopropyl carbamyl-methyl-3-hydroxy-pyridazone-(6) was dissolved in 10 parts by volume of dimethyl formamide and treated with 0.5 part of sodium carbonate and 0.8 part of O,O-diethyl-thiophosphoryl chloride. The mixture was stirred for 3 hours at room temperature and the solution then evaporated to dryness. The residue was dissolved in 50 parts by volume of toluene, and the solution extracted with 5 parts by volume of 5% sodium carbonate solution, dried and evaporated. After recrystallisation from acetone 0.8 part of the desired thiophosphate was obtained, corresponding to 50% of the theoretical yield. M.P=88–89° C.

In a similar manner there may be obtained:

O,O-diethyl-O-[1-N-dimethyl-carbamyl-methyl-pyridazone-(6)-yl-(3)]-thiophosphate; $n_D^{20}$, 1.5302.

O,O-diethyl-O-[1-N-diethyl-carbamyl-methyl-pyridazone-(6)-yl-(3)]-thiophosphate; $n_D^{20}$, 1.5185.

O,O-diethyl-O-[1-N-di-n-propyl-carbamyl-methyl-pyridazone-(6)-yl-(3)]-thiophosphate; $n_D^{20}$, 1.5122.

O,O-diethyl-O-[1-β-(N-dimethyl-carbamyl)-ethyl-pyridazone-(6)-yl-(3)]-thiophosphate; $n_D^{20}$, 1.5166.

O,O-diethyl-O-[1-β-(N-diethyl-carbamyl)-ethyl-pyridazone-(6)-yl-(3)]thiophosphate; $n_D^{20}$, 1.5054.

The following tests illustrate the effectiveness of the compounds of this invention as pesticides:

(1) Dwarf beans belonging to the "Saxa" species, which had been strongly attacked by bean spider mites (*Tetranychus urticae*) were wetted on two consecutive days with 50 ml. of a preparation comprising 0.1, 0.05 and 0.01% of the compound O,O-diethyl-O-[1-β-cyano-ethyl-pyridazone-(6)-yl-(3)]-thiophosphate, so that the reagent was taken up via the roots. The mortality rate of the mites was determined after 72 hours.

(2) Mustard plants (*Sinapis albe*) attacked by green-fly were likewise wetted with 50 ml. of a preparation comprising 0.1, 0.05 and 0.01% of the compound O,O-diethyl-O-[1-β-cyano-ethyl-pyridazone-(6)-yl-(3)]-thiophosphate. In this instance the mortality rate of the green-fly was determined after 24 hours. The results are summarised in the following table:

|  | 0.1% | 0.05% | 0.01% |
| --- | --- | --- | --- |
| (1) Death rate of *Tetranychus urticae* after 72 hours | 100 | 100 | 96 |
| (2) Death rate of green-fly after 24 hours | 100 | 100 | 100 |

We claim:

1. A thiophosphoric acid ester having the formula

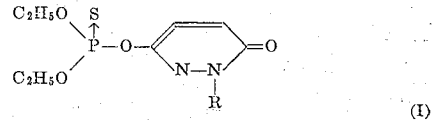

(I)

in which R is a member selected from the group consisting of hydroxy-ethyl, cyano-ethyl, lower alkoxy-carbonyl-methyl, lower alkoxy-carbonyl-ethyl, di-lower alkyl-carbamyl-methyl and di-lower alkyl-carbamyl-ethyl radicals.

2. A thiophosphoric acid ester having the formula

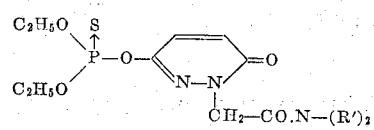

in which R' is a member selected from the group consisting of methyl and ethyl.

3. A thiophosphoric acid ester having the formula

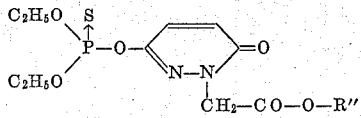

in which R'' is a member selected from the group consisting of methyl, ethyl, n-propyl and isopropyl.

4. A thiophosphoric acid ester having the formula

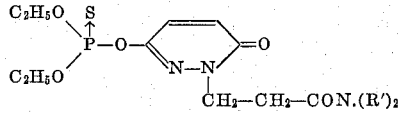

in which R' is a member selected from the group consisting of methyl and ethyl.

5. A thiophosphoric acid ester having the formula

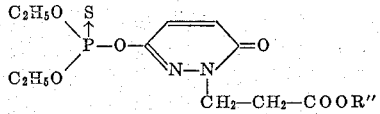

in which R'' is a member selected from the group consisting of methyl, ethyl, n-propyl and isopropyl.

6. O,O - diethyl - O-[-1-β-cyano-ethyl-pyridazone-(6)-yl-(3)-]-thiophosphate.

7. O,O - diethyl - O-[-1-(ethoxy-carbonyl)-methyl-pyridazone-(6)-yl-(3)-]-thiophosphate.

8. O,O - diethyl - O-[-1-β-(isopropoxy-carbonyl)-ethyl-pyridazone-(6)-yl-(3)]-thiophosphate.

9. O,O - diethyl-O-[-1-β-hydroxy-ethyl-pyridazone-(6)-yl-(3)]-thiophosphate.

10. O,O - diethyl-O-[1-β-(N-dimethyl-carbamyl)-ethyl-pyridazone-(6)-yl-(3)]-thiophosphate.

References Cited by the Examiner

UNITED STATES PATENTS 2,918,468   12/1959   Dixon et al. _____ 260—250

NICHOLAS S. RIZZO, *Primary Examiner.*